US012664239B2

(12) United States Patent
Khatri et al.

(10) Patent No.: US 12,664,239 B2
(45) Date of Patent: Jun. 23, 2026

(54) DYNAMIC TRANSITIONING AMONG DEVICE SECURITY STATES BASED ON SERVER AVAILABILITY

(71) Applicant: Dell Products L.P., Round Rock, TX (US)

(72) Inventors: Mukund P. Khatri, Austin, TX (US); Senthilkumar Ponnuswamy, San Jose, CA (US); Eugene David Cho, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 151 days.

(21) Appl. No.: 17/973,797

(22) Filed: Oct. 26, 2022

(65) Prior Publication Data

US 2024/0143708 A1     May 2, 2024

(51) Int. Cl.
| | |
|---|---|
| *G06F 21/31* | (2013.01) |
| *H04L 69/40* | (2022.01) |
| *G06F 11/30* | (2006.01) |

(52) U.S. Cl.
CPC .............. *G06F 21/31* (2013.01); *H04L 69/40* (2013.01); *G06F 11/3055* (2013.01)

(58) Field of Classification Search
CPC ....... G06F 21/31; G06F 11/3055; H04L 69/40
See application file for complete search history.

(56) References Cited

U.S. PATENT DOCUMENTS

| | | | | |
|---|---|---|---|---|
| 8,104,076 B1 * | 1/2012 | Lam | .................... | G06F 21/6218 726/8 |
| 2001/0056554 A1 * | 12/2001 | Chrabaszcz | ......... | H04L 41/0856 714/E11.073 |
| 2003/0226015 A1 * | 12/2003 | Neufeld | ................ | G06F 21/305 713/166 |

(Continued)

OTHER PUBLICATIONS

"Authentication State Machine"; https://developer.apple.com/library/archive/documentation/NetworkingInternet/Conceptual/Hotspot_Network_Subsystem_Guide/Contents/AuthStateMachine.html; downloaded on Oct. 18, 2022.

(Continued)

*Primary Examiner* — William R Korzuch
*Assistant Examiner* — Aditya Sriram
(74) *Attorney, Agent, or Firm* — Ryan, Mason & Lewis, LLP

(57) ABSTRACT

Techniques are provided for dynamic transitioning among device security states based on server availability. One method comprises configuring a processing device to be in a first one of multiple security states, wherein the first security state comprises user authentication factors administered by one or more servers; transitioning the processing device to a different security state, in response to detecting a change in an availability status of a given one of the servers, wherein the different security state comprises a different user authentication factor administered by a different server than the given server; and initiating processing of a user request to perform a privileged action based on a result of an authentication performed using the different user (Continued)

authentication factor of the different security state. The first state and the different state may be associated with a different stage of a product lifecycle and/or with a different designated threat level.

20 Claims, 10 Drawing Sheets

(56)                 References Cited

U.S. PATENT DOCUMENTS

| | | | |
|---|---|---|---|
| 2005/0055552 A1* | 3/2005 | Shigeeda | H04L 63/0823 |
| | | | 713/171 |
| 2008/0189788 A1* | 8/2008 | Bahl | H04L 63/1416 |
| | | | 726/25 |
| 2011/0202983 A1* | 8/2011 | Pope | H04L 41/28 |
| | | | 726/7 |
| 2016/0357950 A1* | 12/2016 | Martel | G06F 21/575 |
| 2018/0041488 A1* | 2/2018 | Kohli | H04L 63/20 |
| 2023/0376606 A1* | 11/2023 | Liu | G06F 21/577 |

OTHER PUBLICATIONS

Hogan Zerry; "Create Client-Side Auth with Finite State Machines, Redux and Redux Sagas"; Published in JavaScript in Plain English; Jan. 4, 2021; https://javascript.plainenglish.io/client-side-authentication-via-finite-state-machines-redux-and-redux-sagas-cd3e0e2bd9ab; downloaded on Oct. 18, 2022.
"RBAC vs. ABAC: Definitions & When to Use"; OKTA; downloaded on Oct. 4, 2022.

* cited by examiner

400

| SECURITY STATE | STATE CONDITIONS | ACTIVE USER CLASSE(S) | AUTHENTICATION FACTORS | USER PRIVILEGES |
|---|---|---|---|---|
| 210-1 | UNAVAILABLE MULTI-FACTOR AUTHENTICATION SERVER | SERVICE ACCOUNT | USER PHYSICAL PRESENCE AND SECOND AUTHENTICATION FACTOR | CONFIGURE USERS |
| 210-2 | AT LEAST ONE OPERATIONAL MULTI-FACTOR AUTHENTICATION SERVER(S) | ADMIN. | SSO, SECOND FACTOR DEVICE | CONFIGURE USERS |
|  |  | OPERATOR | SSO | SYSTEM CONTROL |
|  |  | READ ONLY | SSO | READ LOGS |
| 210-3 | PRESENCE OF IDENTIFIED SERVER | SUPERUSER | USER/PASSWORD; SECOND FACTOR DEVICE; PRESENCE OF IDENTIFIED SERVER | PERFORM PRIVILEGED OPERATIONS; CREATE AND EDIT SECURITY STATES |

FIG. 4

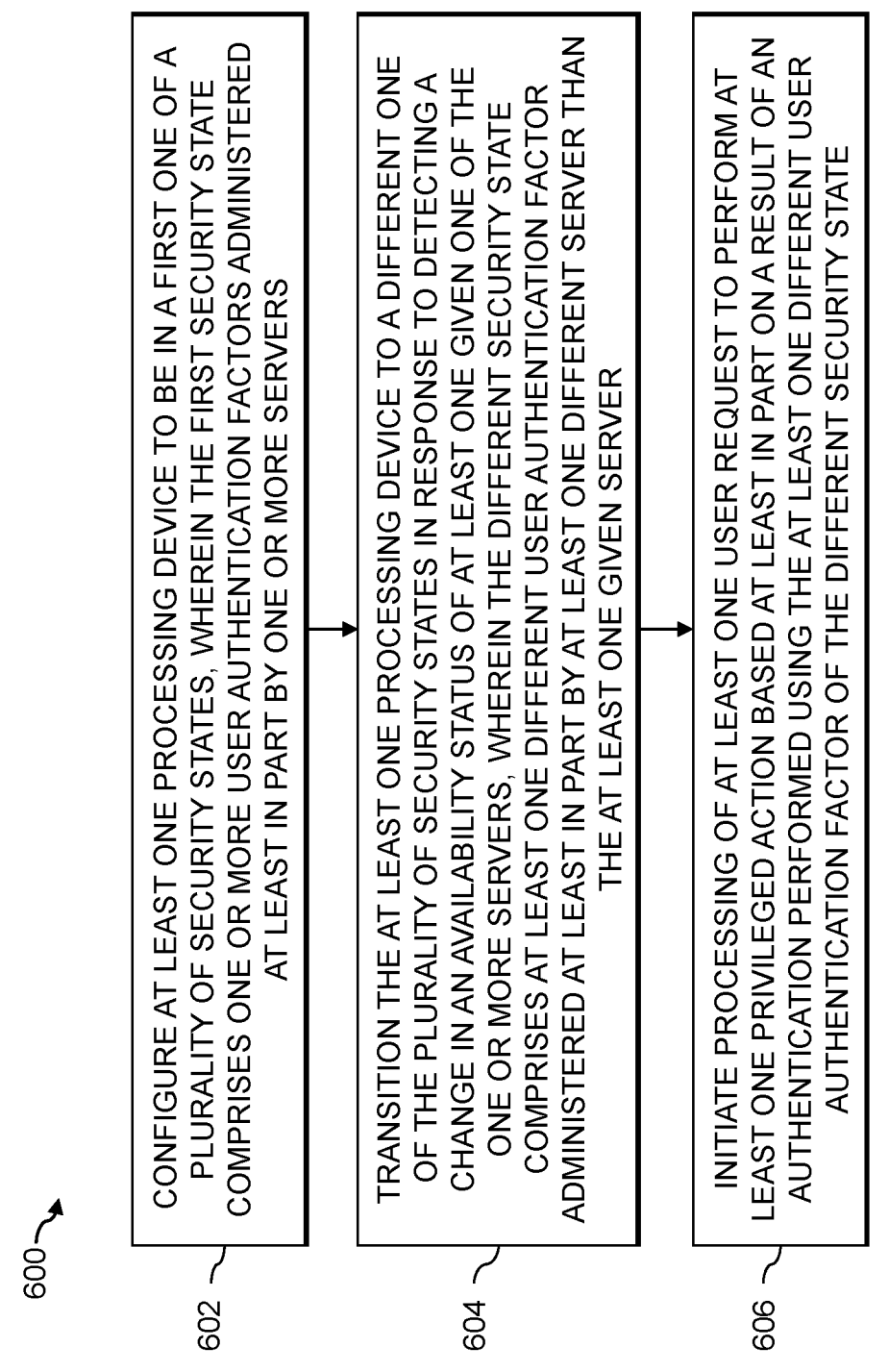

CONFIGURE AT LEAST ONE PROCESSING DEVICE TO BE IN A FIRST ONE OF A PLURALITY OF SECURITY STATES, WHEREIN THE FIRST SECURITY STATE COMPRISES ONE OR MORE USER AUTHENTICATION FACTORS ADMINISTERED AT LEAST IN PART BY ONE OR MORE SERVERS

TRANSITION THE AT LEAST ONE PROCESSING DEVICE TO A DIFFERENT ONE OF THE PLURALITY OF SECURITY STATES IN RESPONSE TO DETECTING A CHANGE IN AN AVAILABILITY STATUS OF AT LEAST ONE GIVEN ONE OF THE ONE OR MORE SERVERS, WHEREIN THE DIFFERENT SECURITY STATE COMPRISES AT LEAST ONE DIFFERENT USER AUTHENTICATION FACTOR ADMINISTERED AT LEAST IN PART BY AT LEAST ONE DIFFERENT SERVER THAN THE AT LEAST ONE GIVEN SERVER

INITIATE PROCESSING OF AT LEAST ONE USER REQUEST TO PERFORM AT LEAST ONE PRIVILEGED ACTION BASED AT LEAST IN PART ON A RESULT OF AN AUTHENTICATION PERFORMED USING THE AT LEAST ONE DIFFERENT USER AUTHENTICATION FACTOR OF THE DIFFERENT SECURITY STATE

FIG. 6

DYNAMIC TRANSITIONING AMONG DEVICE SECURITY STATES BASED ON SERVER AVAILABILITY

FIELD

The field relates generally to information processing systems, and more particularly to security in such information processing systems.

BACKGROUND

Computing devices are typically configured to incorporate security functionality to protect such devices from unauthorized and/or malicious activity. For example, it may be desirable to prevent suspicious computer operations, such as those implemented by an illegitimate and/or unauthorized user. The availability of such security functionality, as well as the threats faced by such security functionality, can change over time.

A need exists for a more dynamic approach to protecting computing devices.

SUMMARY

In one embodiment, a method comprises configuring at least one processing device comprising a processor coupled to a memory to be in a first one of a plurality of security states, wherein the first security state comprises one or more user authentication factors administered at least in part by one or more servers; transitioning the at least one processing device to a different one of the plurality of security states, in response to detecting a change in an availability status of at least one given one of the one or more servers, wherein the different security state comprises at least one different user authentication factor administered at least in part by at least one different server than the at least one given server; and initiating processing of at least one user request to perform at least one privileged action based at least in part on a result of an authentication performed using the at least one different user authentication factor of the different security state.

In one or more embodiments, at least one of the first state and the different state comprises different authentication factors for two or more different classes of users. The at least one of the first state and the different state may comprise a respective specification of authentication factors and user privileges for each of the two or more different classes of users.

In some embodiments, the first state and the different state are each associated with a different stage of a product lifecycle associated with the at least one processing device, and/or with a different designated threat level associated with the at least one processing device.

Other illustrative embodiments include, without limitation, apparatus, systems, methods and computer program products comprising processor-readable storage media.

BRIEF DESCRIPTION OF THE DRAWINGS

FIG. 4 is a table illustrating exemplary information associated with the various security states of FIG. 2 in accordance with an illustrative embodiment;

FIG. 6 is a flow chart illustrating an exemplary implementation of a process for dynamic transitioning among device security states based on server availability in accordance with an illustrative embodiment;

DETAILED DESCRIPTION

Figure 1A:
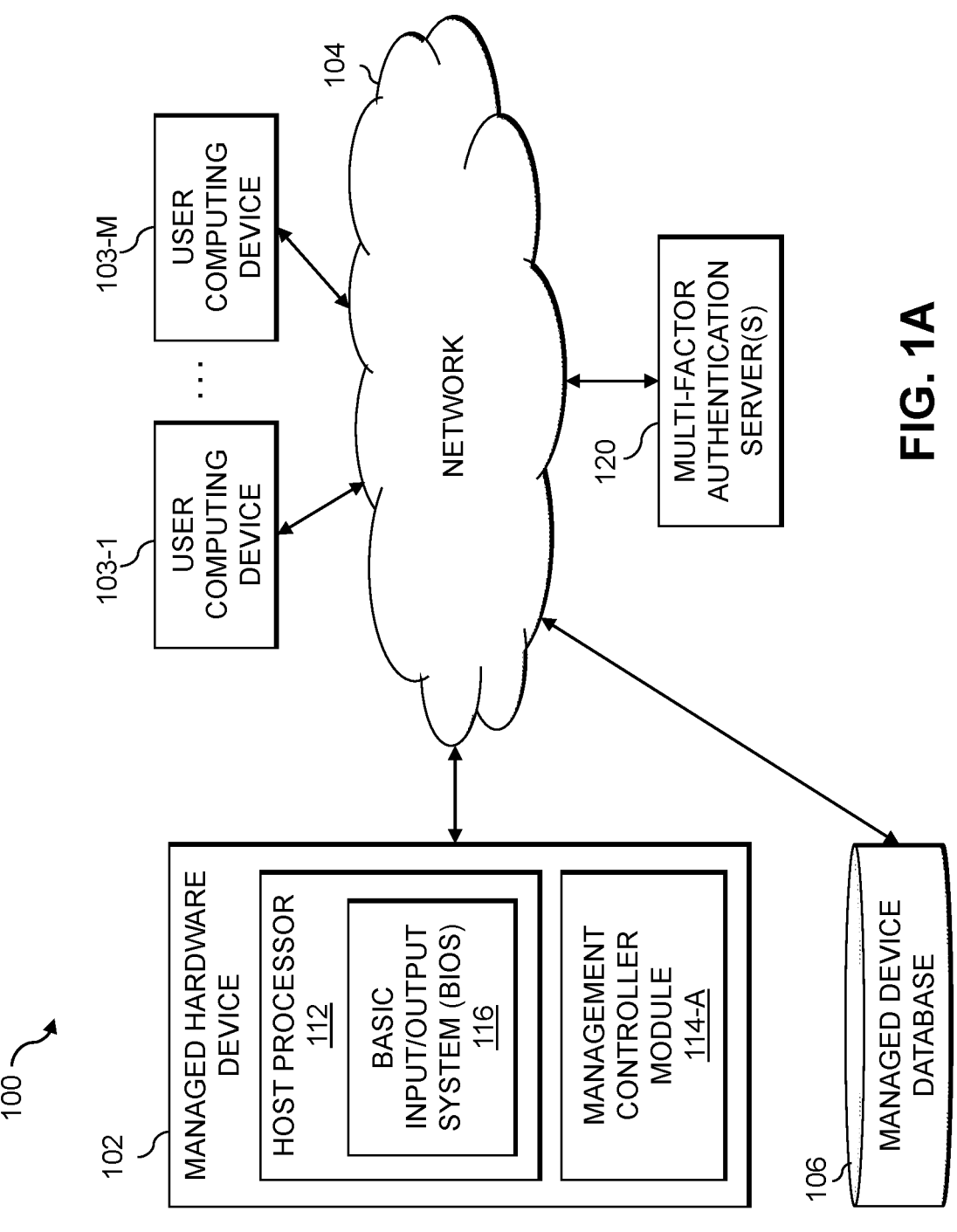
FIGS. 1A and 1B illustrate information processing systems configured to protect devices using dynamic security state transitioning in accordance with illustrative embodiments.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for dynamic transitioning among device security states based on server availability.

Existing computer security functionality is typically statically configured and does not support dynamic programmatic changes in security requirements. For example, a configuration of a given security feature is typically statically enabled by turning the security feature on or off. In addition, existing computer security functionality is typically unable to adapt to dynamic changes in security infrastructure (for example, when an authentication server needed to approve a transaction becomes unavailable). While existing computer security functionality may consider security risks, the operational risk resulting from product downtime (for example, when a server associated with a transaction becomes unavailable) is not addressed.

One or more aspects of the disclosure recognize that such static security configurations are unable to capture the full lifecycle of a product and unable to provide appropriate protection for each phase or stage of the lifecycle (such as a production phase, a recovery phase and a non-production phase). Most existing computer security functionality is defined only for the production phase of a given product.

In one or more embodiments, the disclosed dynamic security state transitioning techniques provide multiple security states that each define one or more different user authentication requirements administered by one or more authentication servers and other security infrastructure. In the event that a change is detected regarding an availability of a particular server being employed by a currently active security state, a transition is initiated to a different security state having different user authentication requirements that are administered by a different server than the unavailable server.

In some embodiments, in response to a detected error condition for a current security feature employed by a current security state, a state machine can be employed using the disclosed dynamic security state transitioning techniques to transition to a new security state that employs a different security feature than the current security feature having the detected error condition.

Among other benefits, the disclosed techniques for dynamic transitioning among device security states based on server availability provide multiple sets of security requirements, that allow an organization to address the security needs of multiple phases of a product lifecycle, for example. In addition, the disclosed dynamic security state transitioning techniques allow the computer security functionality to adapt to changes in the availability of security infrastructure.

Figure 1B:
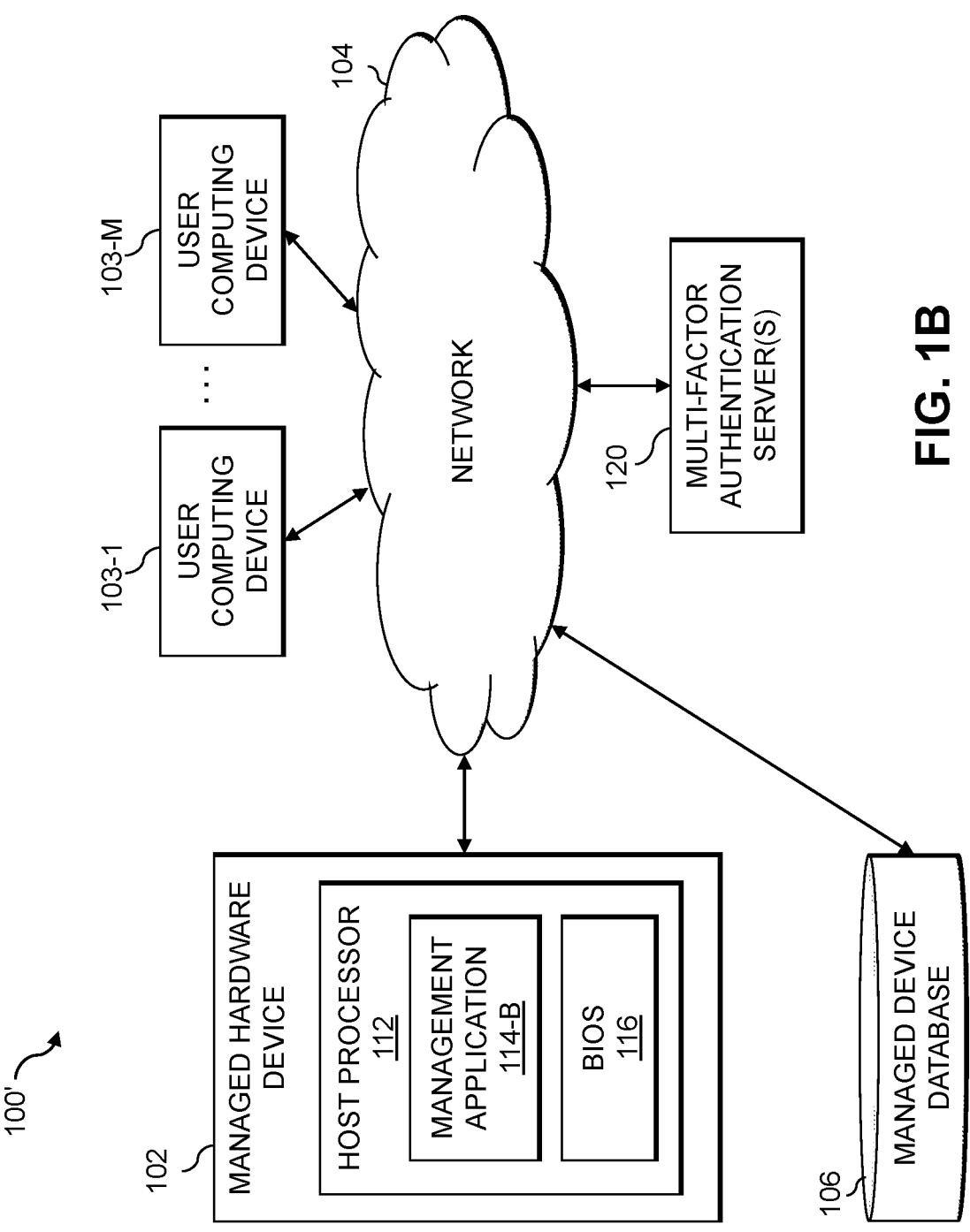

FIGS. 1A and 1B illustrate computer networks (also referred to herein as information processing systems) 100, 100' configured to protect devices using dynamic security state transitioning in accordance with illustrative embodiments.

The computer network 100 comprises a plurality of user computing devices 103-1 through 103-M, collectively referred to herein as user computing devices 103. The user computing devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIGS. 1A and 1B embodiments. Also coupled to network 104 is one or more managed hardware devices 102, one or more managed device databases 106, and one or more multi-factor authentication servers 120, discussed below.

The managed hardware devices 102 and/or user computing devices 103 may comprise, for example, host devices, storage appliances and/or devices such as mobile telephones, laptop computers, tablet computers, desktop computers or other types of computing devices. Such devices are examples of what are more generally referred to herein as "processing devices." Some of these processing devices are also generally referred to herein as "computers." The managed hardware devices 102 and/or user computing devices 103 may comprise a network client that includes networking capabilities such as ethernet, Wi-Fi, etc. When the managed hardware devices 102 and/or user computing devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user computing devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1A, an exemplary managed hardware device 102 may comprise a host processor 112 and a management controller module 114-A. In the example of FIG. 1A, the management controller module 114-A is assumed to be implemented as a dedicated baseboard management controller (BMC), such as the Integrated Dell Remote Access Controller (iDRAC), commercially available from Dell Technologies, or another out-of-band (OOB) controller. The host processor 112 implements a basic input/output system (BIOS) 116.

It is to be appreciated that this particular arrangement of elements 112, 114-A, 116 illustrated in the managed hardware device 102 of the FIG. 1A embodiment is presented by way of example only, and alternative arrangements can be used in other embodiments. For example, the functionality associated with elements 112, 114-A, 116 in other embodiments can be combined into a single element, or separated across a larger number of elements. As another example, multiple distinct processors can be used to implement different ones of elements 112, 114-A, 116 or portions thereof.

At least portions of elements 112, 114-A, 116 may be implemented at least in part in the form of software that is stored in memory and executed by a processor. An exemplary process utilizing elements 112, 114-A, 116 of the managed hardware device 102 in computer network 100 will be described in more detail with reference to FIG. 6, for example.

In the example of FIG. 1B, a management application 114-B that executes on the host processor 112 is assumed to be implemented as a software application that executes the functions of a baseboard management controller, such as the iDRAC, referenced above. The other elements of FIG. 1B are assumed to be implemented in some embodiments in the same or a similar manner as the like-numbered elements of FIG. 1A and are not separately discussed herein.

The term "management controller," as used herein, is intended to be broadly construed to encompass a dedicated management controller, such as management controller module 114-A, or a management application, such as management application 114-B, as would be apparent to a person of ordinary skill in the art.

Other managed hardware devices 102 (not shown in FIGS. 1A and 1B) are assumed to be configured in a manner similar to that shown for managed hardware device 102 in the figure.

The multi-factor authentication server 120 may be implemented, for example, on the cloud, such as a private cloud, or on the premises of an enterprise or another entity. In some embodiments, the multi-factor authentication server 120, or portions thereof, may be implemented as part of a host device.

Additionally, the managed hardware device 102, user computing devices 103 and/or the multi-factor authentication server 120 can have an associated managed device database 106 configured to store, for example, information related to various managed devices, such as one or more managed hardware devices 102, such as device locations, network address assignments and performance data.

The managed device database 106 in the present embodiment is implemented using one or more storage systems associated with the multi-factor authentication server 120.

Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more managed hardware devices 102, user computing devices 103 and/or multi-factor authentication servers 120 may be implemented on a common processing platform, or on separate processing platforms. The managed hardware devices 102 and/or user computing devices 103 may be configured to interact over the network 104 in at least some embodiments with the multi-factor authentication server 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more managed hardware devices 102, user computing devices 103 and/or multi-factor authentication servers 120 can be one or more input-output devices (not shown), which illustratively comprise keyboards, displays or other types of input-output devices in any combination. Such input-output devices can be used, for example, to support one or more user interfaces to the managed hardware devices 102 and/or the multi-factor authentication server 120, as well as to support communications between the managed hardware devices 102, multi-factor authentication server 120 and other related systems and devices not explicitly shown.

The one or more managed hardware devices 102, user computing devices 103 and/or multi-factor authentication servers 120 in the FIGS. 1A and 1B embodiments are assumed to be implemented using at least one processing device. Each such processing device generally comprises at least one processor and an associated memory, and implements one or more functional modules for controlling certain features of the respective device.

More particularly, the one or more managed hardware devices 102, user computing devices 103 and/or multi-factor authentication servers 120 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more managed hardware devices 102, user computing devices 103 and/or multi-factor authentication servers 120 to communicate in some embodiments over the network 104 with each other (as well as one or more other networked devices), and illustratively comprises one or more conventional transceivers.

It is to be understood that the particular set of elements shown in FIGS. 1A and 1B for dynamic transitioning among device security states based on server availability is presented by way of illustrative example only, and in other embodiments additional or alternative elements may be used. Thus, another embodiment includes additional or alternative systems, devices and other network entities, as well as different arrangements of modules and other components.

Figure 2:
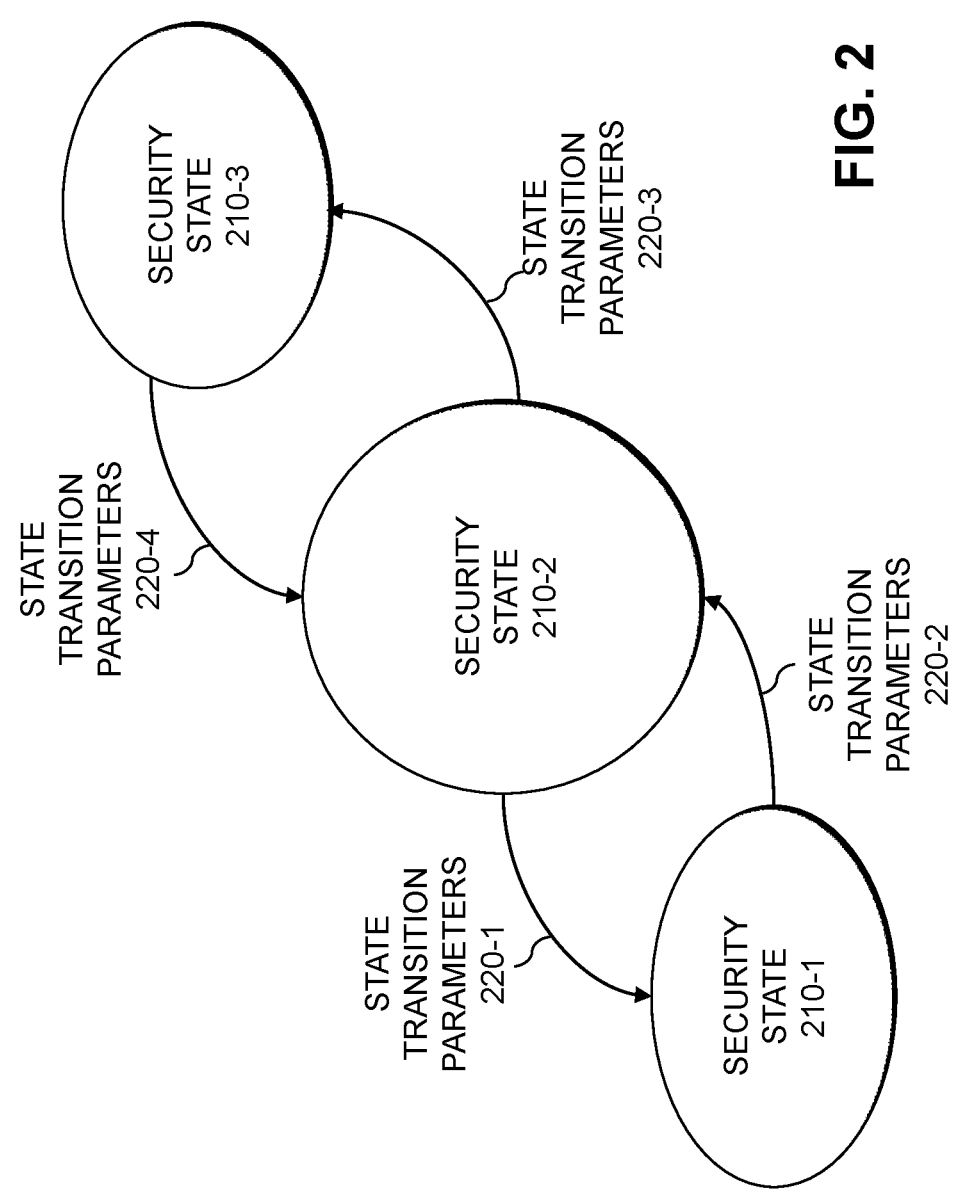
FIG. 2 is a state diagram illustrating multiple security states of a representative managed hardware device in accordance with an illustrative embodiment.

FIG. 2 is a state diagram illustrating multiple security states 210-1 through 210-3 of a representative managed hardware device in accordance with an illustrative embodiment. In the example of FIG. 2, one or more state transition parameters 220-1 through 220-4 are defined for transitioning among the multiple security states 210-1 through 210-3. The state transition parameters 220 may be based, for example, on state conditions defined for each security state 210, as discussed further below in conjunction with FIG. 4. Each security state 210 may be associated with, for example, a different product lifecycle stage and/or a different threat level (e.g., as defined by a particular customer).

The state diagram supports multiple sets of security requirements (e.g., each state has a different set of security requirements comprising authentication requirements and corresponding user privileges). The state diagram may be implemented, for example, by a management controller (e.g., management controller module 114-A of FIG. 1A or management application 114-B of FIG. 1B) using a security requirements state machine. Such a state machine can be programmed by a customer, for example, as part of the provisioning of one or more managed hardware devices and can identify the conditions in the customer environment that should be monitored by the management controller.

In some embodiments, a user interface can be provided for the managed hardware device 102, for example, that allows a user to define the security states 210 and the state transition parameters 220. In various implementations, the security requirements state machine can be defined for each instance of a product, or for an entire product line or portions thereof (where the security requirements state machine can be pushed to each instance of a given product).

Figure 3A:
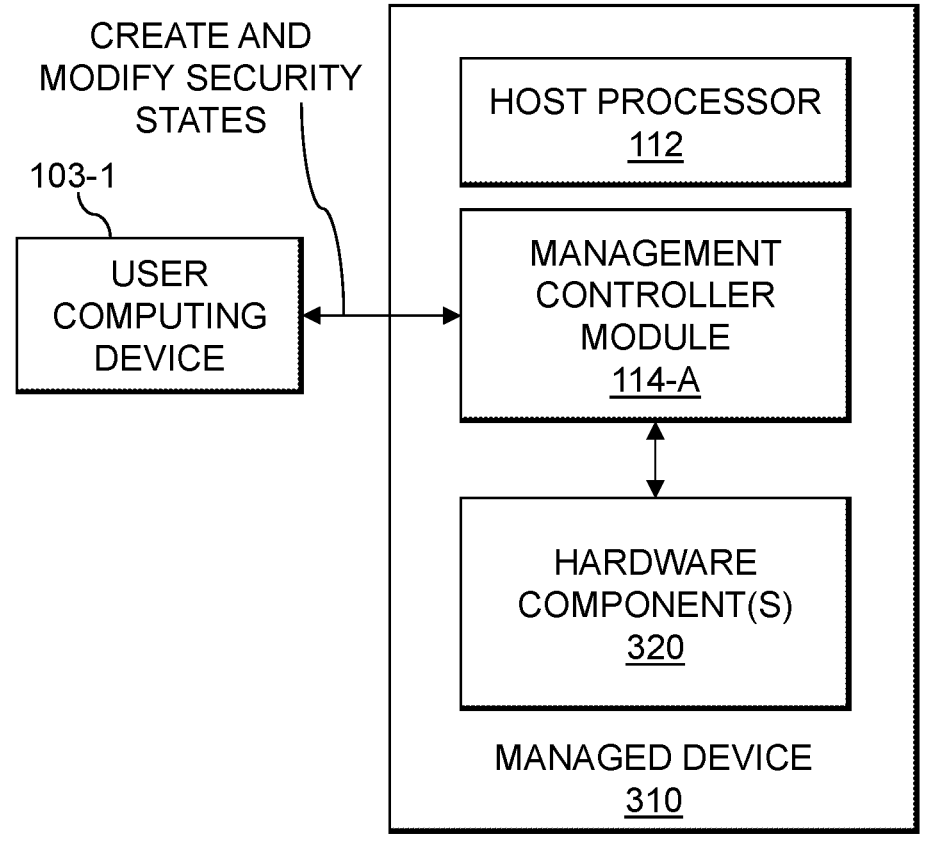
FIGS. 3A and 3B illustrate a user creating and modifying security states for respective managed devices in accordance with illustrative embodiments.
Figure 3B:
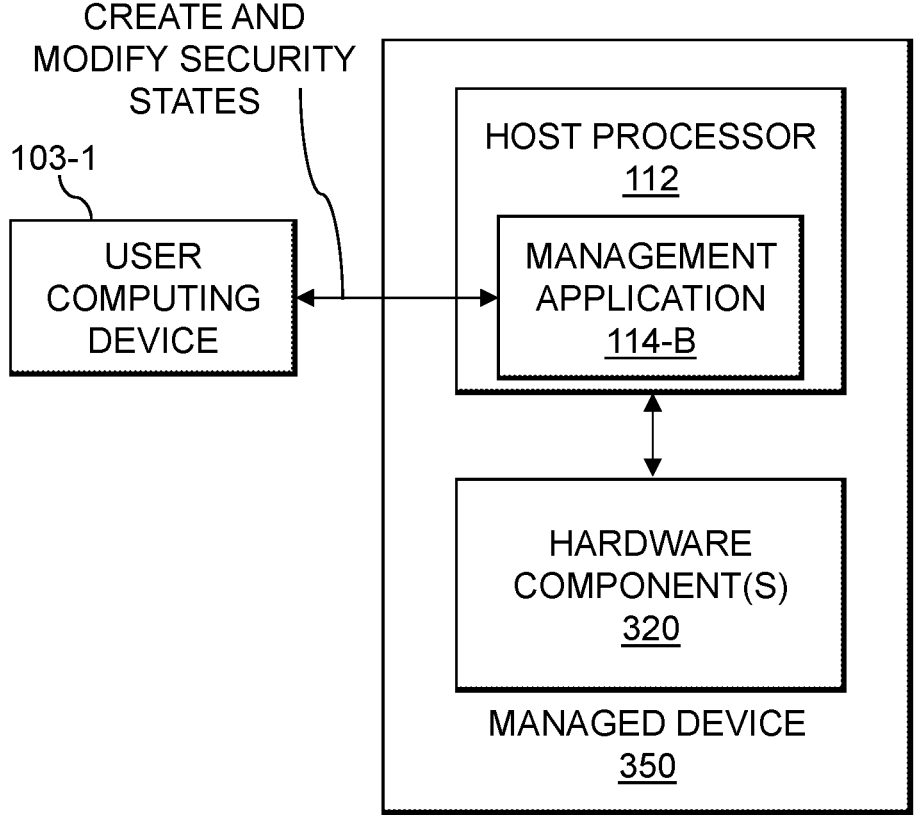

FIGS. 3A and 3B illustrate a user creating and modifying security states 210 (and corresponding state transition parameters 220) for respective managed devices 310, 350 in accordance with illustrative embodiments. In the example of FIG. 3A, a user of user computing device 103-1 creates and modifies one or more security states 210 for a managed device 310 by interacting with the management controller module 114-A of the managed device 310. The managed device 310 comprises the management controller module 114-A, a host processor 112 and one or more hardware components 320. The management controller module 114-A maintains the security state information and will monitor for environmental conditions (e.g., server unavailability) that impact the state conditions associated with one or more of the security states 210. The management controller module 114-A will determine if dynamic security state transitioning to a different state is needed, as discussed further below in conjunction with FIGS. 4 and 6, for example.

In the example of FIG. 3B, a user of user computing device 103-1 creates and modifies one or more security states 210 for a managed device 350 by interacting with the management application module 114-B of the managed device 350. The managed device 350 comprises the management controller module 114-B, a host processor 112 and one or more hardware components 320. The management application 114-B maintains the state information and will monitor for environmental conditions (e.g., server unavailability) that impact the state conditions associated with one or more of the security states 210 and determine if dynamic security state transitioning to another state is needed, as discussed further below in conjunction with FIGS. 4 and 6, for example.

FIG. 4 is a table 400 illustrating exemplary information associated with the various security states 210 of FIG. 2 in accordance with an illustrative embodiment. In the example of FIG. 4, one or more state conditions and one or more active user classes are defined for each security state 210. In addition, for each active user class in a given security state 210, one or more authentication factors and one or more user privileges are defined for each active user class for each security state 210. For example, for security state 210-1, the state conditions comprise a non-operational multi-factor authentication server. Such a state condition can be expressed as a state transition parameter 220 whereby a state transition is initiated from a current to a new state when a multi-factor authentication server used by the current state is detected to be non-operational or otherwise unavailable.

The active user classes for security state 210-1 (e.g., an emergency security state) comprise a service account. The authentication factors associated with the service account of security state 210-1 comprise a physical presence of a user (e.g., in a certain location) and a second authentication factor. The physical presence of the user in a certain location may be determined, for example, by the user swiping an access card to enter the location, the user connecting a security key in the location or the user pressing a button or entering a code in the location). The user privileges associated with the service account of security state 210-1 comprise the ability of the service account user to configure other users.

For security state 210-2 (e.g., a default state), the state conditions comprise at least one operational multi-factor authentication server. The active user classes for security state 210-2 comprise an administrator account, an operator account and a read only account. The authentication factors associated with the administrator account of security state 210-2 comprise a single sign-on (SSO) by the administrator, and the administrator having a second factor device (e.g., a security key or an RSA SecurID), and the corresponding user privileges of the administrator comprise the ability to configure other users.

It is noted that the user privileges are the same for the service account of state 210-1 and the administrator account of state 210-2, even though the authentication factor requirements are different.

The authentication factors associated with the operator account of security state 210-2 comprise an SSO by the operator, and the corresponding user privileges of the operator comprise the ability to perform system control actions.

The authentication factors associated with the read only account of security state 210-2 comprise an SSO by the read only user, and the corresponding user privileges of the read only user comprise the ability to read logs.

For security state 210-3 (e.g., an elevated security state), the state conditions comprise the presence of an identified server (e.g., a server associated with a particular secure area, such as an LDAP (Lightweight Directory Access Protocol) server in a non-production environment). The active user classes for security state 210-3 comprise a superuser account (e.g., a user that can log in and perform actions on behalf of another user). The authentication factors associated with the superuser of security state 210-3 comprise the superuser having a user/password, a second factor device and also the presence of the identified server. The user privileges associated with the superuser of security state 210-3 comprise performing privileged operations or actions (e.g., predefined sensitive operations, such as data destruction operations or logging into a protected resource, collectively referred to herein as privileged actions); and to create and edit security states 210.

It is noted that such user privileges of the superuser account of state 210-3 are not available in state 210-2 (e.g., a default state such as a production mode). To unlock the capabilities of the superuser, a customer (e.g., an enterprise owner of the managed hardware device 102) could require that such operations are only performed in a unique customer environment, such as an environment having additional multi-factor authentication servers that are only in a special air-gapped facility or room, such as in a particular datacenter. In this manner, security risks are reduced, as such privileged operations or actions cannot be used in a ransomware attack.

It is noted that such authentication factors and user privileges (e.g., access controls) are often collectively referred to as an identity and access management (IAM) framework of policies and technologies that ensure that authorized users have the appropriate access to the necessary technology resources.

In this manner, the disclosed techniques for dynamic transitioning among security states 210 based on server availability allow products to be environmentally aware, and to transition to a different security state depending on the availability of specified security infrastructure. The transitions 220 among the defined security states 210 can be conditioned on the availability of such specified security infrastructure. The ability to transition among the various security states 210, each having different security requirements, permits more granular security controls and an adaptive security approach.

The management controller module 114-A of FIG. 3A and/or the management application 114-B of FIG. 3B (i) maintain the security state information in some embodiments; (ii) monitor for environmental conditions (e.g., server unavailability) that impact the state conditions associated with one or more of the security states 210; and (iii) determine if dynamic security state transitioning to a different state is needed.

Figure 5:
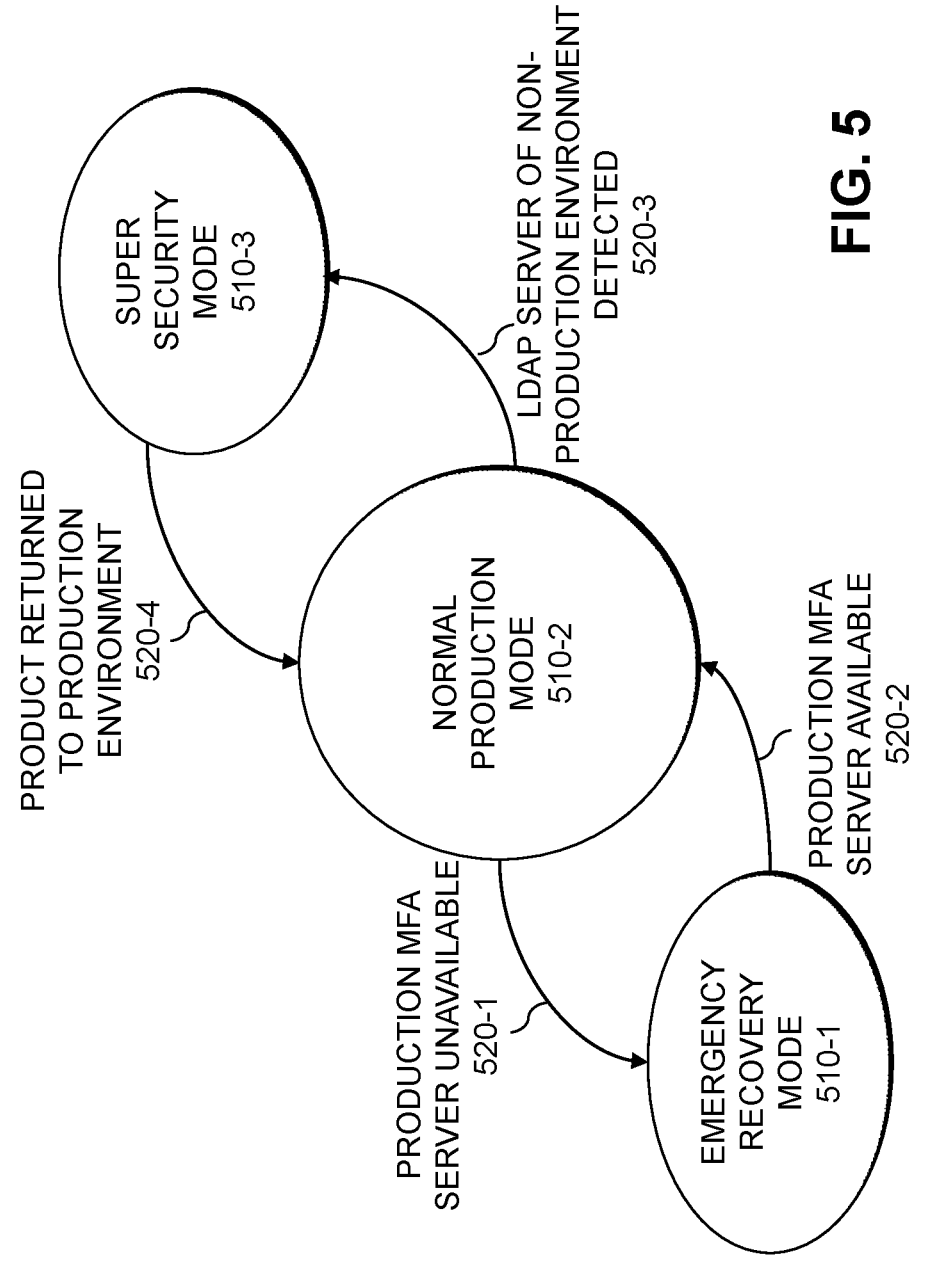
FIG. 5 is a state diagram illustrating multiple security states associated with corresponding stages of a product lifecycle of a representative managed hardware device in accordance with an illustrative embodiment.

FIG. 5 is a state diagram illustrating multiple security states (or modes) 510-1 through 510-3 associated with corresponding stages of a product lifecycle of a representative managed hardware device in accordance with an illustrative embodiment. In the example of FIG. 5, state 510-1 corresponds to an emergency recovery mode, state 510-2 corresponds to a normal production mode, and state 510-3 corresponds to a super security mode (e.g., only accessible in a non-production environment).

In some embodiments, states 510-1 and 510-2 may correspond to a production environment of an enterprise (e.g., with state 510-2 corresponding to a normal production state and state 510-1 corresponding to a production downtime state, for example, due to a hardware failure). Likewise, state 510-3 may correspond to a non-production environment (e.g., when a product, such as a managed hardware device 102, is in a designated non-production environment, for example, for an initial provisioning, a system retirement and/or a reprovisioning of the device).

In addition, transition 520-1 transitions the state machine from the normal production mode state 510-2 to the emergency recovery mode state 510-1 when the production MFA (multi-factor authentication) server (or another server required to maintain normal operations in the normal production mode) is not operating or is otherwise unavailable, or if a user exceeds a maximum number of password retry attempts. For example, transition 520-1 may be defined to transition whenever there is a problem with the production environment, such as the MFA server (or another server needed to provide the authentication factors defined for the respective state) being unavailable. The emergency recovery mode state 510-1 could allow "less secure" but more readily available authentication factors, such as a physical presence or an email or text-based authentication, to permit a recovery.

Transition 520-2 transitions the state machine from the emergency recovery mode state 510-1 to the normal production mode state 510-2 when the production MFA server (or another server required to maintain operations in the normal production mode) is online or otherwise available again.

Further, transition 520-3 transitions the state machine from the normal production mode state 510-2 to the super security mode state 510-3 when the LDAP server (or another designated server) of a non-production environment is detected (indicating that the managed hardware device is in the non-production environment). The LDAP server is representative of a server found in a non-production environment but the transition 520-3 may be based on any server or device indicating the presence of the managed hardware device in a particular designated area. The super security mode state 510-3 would typically be activated with the presence of stronger security infrastructure being available (e.g., in a "most secure" environment). In this manner, more stringent security controls can be placed on the ability to change a security configuration and/or the states of the state machine (e.g., by allowing such security changes only in the most secure state).

Transition 520-4 transitions the state machine from the super security mode state 510-3 to the normal production mode state 510-2 when the product (e.g., the managed hardware device) is returned to the production environment (e.g., when the LDAP server (or another designated server) is no longer detected indicating the presence of the managed hardware device in a particular area).

In general, the state transition requirements 520 may be based, for example, on state conditions defined for each security state 510, as discussed above in conjunction with FIG. 4, for example, as would be apparent to a person of ordinary skill in the art.

In this manner, the disclosed techniques for dynamic transitioning among security states (or modes) 510 based on server availability allow products to be environmentally aware, and to transition to a different security state 510 depending on the availability of specified security infrastructure. The transitions 520 among the defined security states 510 can be conditioned on the availability of such specified security infrastructure. The ability to transition among the various security states 510, each having different security requirements (e.g., as defined in the table 400 of FIG. 4), permits more granular security controls and an adaptive security approach that increases business continuity.

FIG. 6 is a flow chart illustrating an exemplary implementation of a process 600 for dynamic transitioning among device security states based on server availability in accordance with an illustrative embodiment. In the example of FIG. 6, at least one processing device is configured in step 602 to be in a first one of a plurality of security states, wherein the first security state comprises one or more user authentication factors administered at least in part by one or more servers. For example, the first security state may evaluate one or more user authentication factors as part of a user authentication. The first state may comprise one or more authentication requirements that evaluate the one or more user authentication factors. As used herein, the term "authentication requirement" shall be broadly construed so as to encompass one or more combinations of different authentication parameters for a successful authentication, such as a conditional satisfaction of a subset of multiple items, and/or other conditions for a user authentication, such as a list of alternative authentication factors (e.g., any three of five enumerated authentication factors, or at least one of factor A and factor B and at least one of factor C and factor D), as would be apparent to a person of ordinary skill in the art.

The process 600 transitions the at least one processing device to a different one of the plurality of security states in step 604, in response to detecting a change in an availability status of at least one given one of the one or more servers, wherein the different security state comprises at least one different user authentication factor administered at least in part by at least one different server than the at least one given server.

In step 606, a processing of at least one user request to perform at least one privileged action is initiated based at least in part on a result of an authentication performed using the at least one different user authentication factor of the different security state.

In some embodiments, at least one of the first state and the different state comprises different authentication factors for two or more different classes of users. The at least one of the first state and the different state may comprise a respective specification of authentication factors and user privileges for each of the two or more different classes of users. At least one of the first state and the different state may comprise at least one authentication factor based at least in part on a physical presence of a user in proximity to a designated authentication server.

In one or more embodiments, the first state and the different state are each associated with a different stage of a product lifecycle associated with the at least one processing device and/or with a different designated threat level associated with the at least one processing device.

In at least one embodiment, a management controller receives a specification of the respective user authentication factors of at least one of the first state and the different state.

The particular processing operations and other network functionality described in conjunction with FIG. 6, for example, are presented by way of illustrative example only, and should not be construed as limiting the scope of the disclosure in any way. Alternative embodiments can use other types of processing operations for dynamic transitioning among device security states based on server availability. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed dynamic security state transitioning techniques can be employed, for example, to dynamically transition among device security states based on server availability. In this manner, products are environmentally aware and can transition to a different security state based on an availability of specified security infrastructure. The disclosed security techniques permit more granular security controls and an adaptive security approach that increases business continuity.

One or more embodiments of the disclosure provide improved methods, apparatus and computer program products for dynamic transitioning among device security states based on server availability. The foregoing applications and associated embodiments should be considered as illustrative only, and numerous other embodiments can be configured using the techniques disclosed herein, in a wide variety of different applications.

It should also be understood that the disclosed dynamic security state transitioning techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for dynamic transitioning among device security states based on server availability may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based dynamic security state transitioning engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based dynamic security state transitioning platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
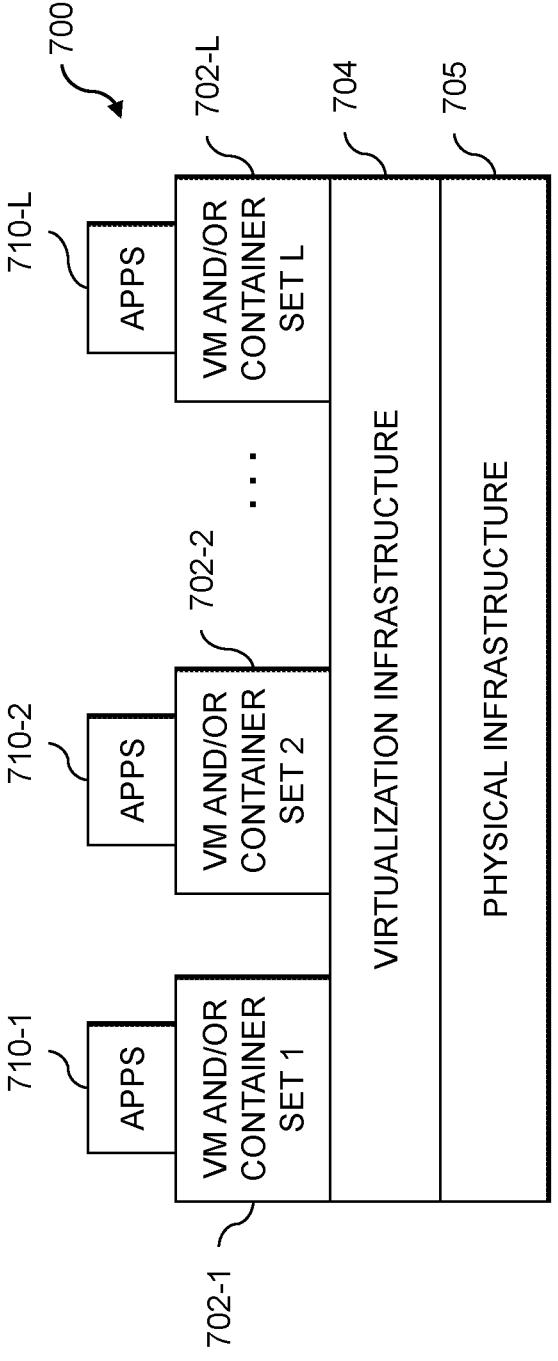
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide dynamic security state transitioning functionality of the type described above for one or more processes running on a given one of the VMs. For example, each of the VMs can implement dynamic security state transitioning control logic and associated authentication functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide dynamic security state transitioning functionality of the type described above for one or more processes running on different ones of the containers. For example, a container host device supporting multiple containers of one or more container sets can implement one or more instances of dynamic security state transitioning control logic and associated authentication functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
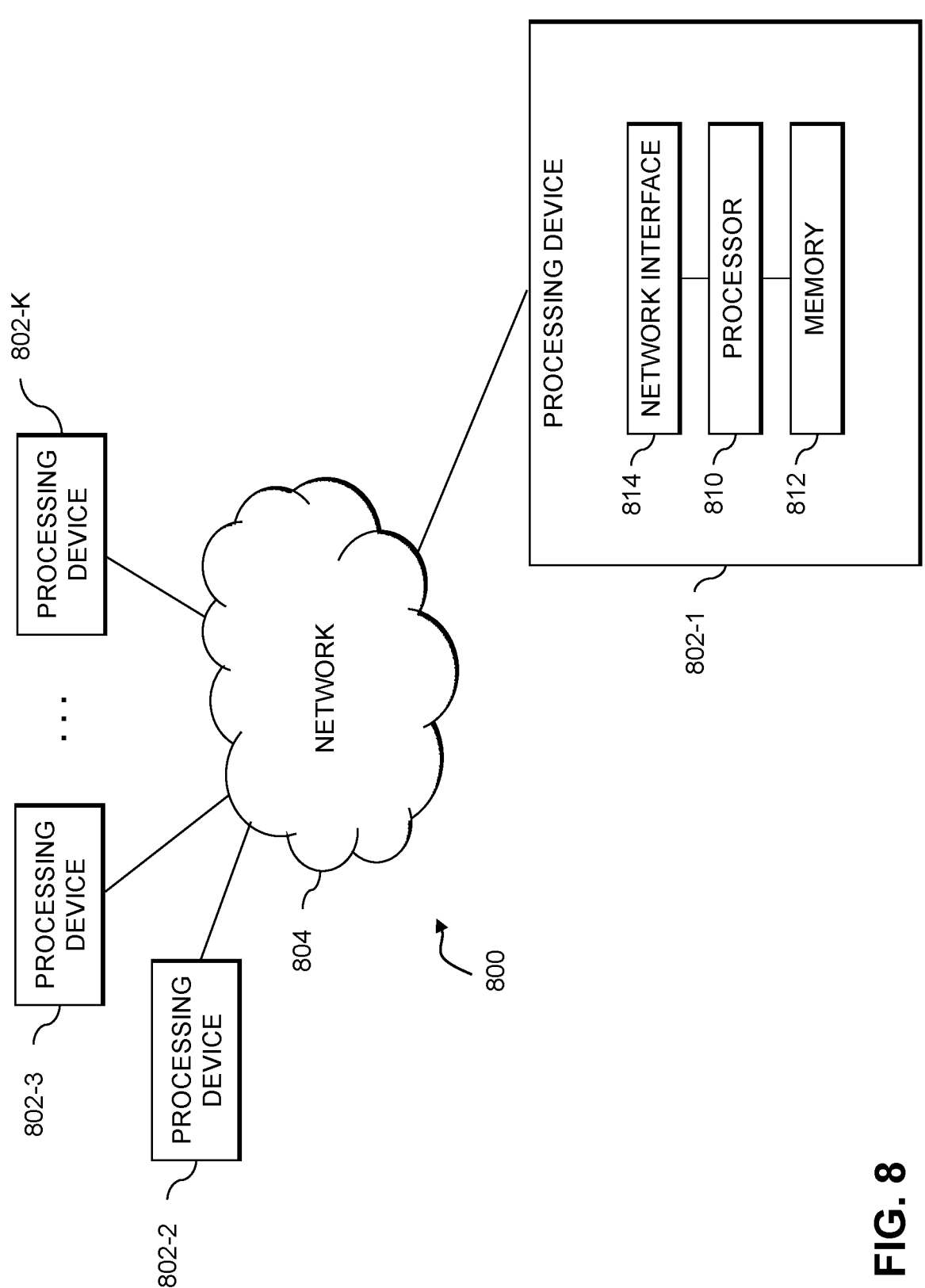
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

configuring at least one processing device comprising a processor coupled to a memory to be in a first one of a plurality of security states, wherein the first security state defines one or more user authentication factors evaluated at least in part by one or more server devices that authenticate one or more users, wherein the one or more server devices are distinct from the at least one processing device;

automatically transitioning, by the at least one processing device, the at least one processing device to a different security state of the plurality of security states, in response to detecting, by the at least one processing device, an unavailability status of at least a given server device of the one or more server devices, wherein the different security state defines at least one different user authentication factor to be evaluated at least in part by at least one different server device, of the one or more server devices, wherein the at least one different user authentication factor is different than each of the one or more user authentication factors evaluated by the at least one given server device, wherein the at least one different server device is available at a time of the automatic transition and authenticates one or more users using the at least one different user authentication factor, wherein the one or more user authentication factors and the at least one different user authentication factor are distinct from the one or more server devices; and initiating, by the at least one processing device, a processing of at least one user request, from a given user of the one or more users, to perform at least one automated action based at least in part on a result of an authentication performed using the at least one different user authentication factor of the different security state, wherein the given user is authenticated in response to a successful evaluation of the at least one different user authentication factor by the at least one different server device;

wherein the method is performed by the at least one processing device.

2. The method of claim 1, wherein at least one of the first security state and the different security state comprises different authentication factors for two or more different classes of users.

3. The method of claim 2, wherein at least one of the first security state and the different security state comprises a respective specification of authentication factors and user privileges for each of the two or more different classes of users.

4. The method of claim 1, wherein the first security state and the different security state are each associated with a different stage of a product lifecycle associated with the at least one processing device.

5. The method of claim 1, wherein the first security state and the different security state are each associated with a different designated threat level associated with the at least one processing device.

6. The method of claim 1, further comprising receiving, by a management controller, a specification of the respective user authentication factors of at least one of the first security state and the different security state.

7. The method of claim 1, wherein at least one of the first security state and the different security state comprises at least one authentication factor based at least in part on a physical presence of a user in proximity to a designated authentication server.

8. An apparatus comprising:

at least one processing device comprising a processor coupled to a memory;

the at least one processing device being configured to implement the following steps:

configuring at least one processing device comprising a processor coupled to a memory to be in a first one of a plurality of security states, wherein the first security state defines one or more user authentication factors evaluated at least in part by one or more server devices that authenticate one or more users, wherein the one or more server devices are distinct from the at least one processing device;

automatically transitioning, by the at least one processing device, the at least one processing device to a different security state of the plurality of security states, in response to detecting, by the at least one processing device, an unavailability status of at least a given server device of the one or more server devices, wherein the different security state defines at least one different user authentication factor to be evaluated at least in part by at least one different server device, of the one or more server devices, wherein the at least one different user authentication factor is different than each of the one or more user authentication factors evaluated by the at least one given server device, wherein the at least one different server device is available at a time of the automatic transition and authenticates one or more users using the at least one different user authentication factor, wherein the one or more user authentication factors and the at least one different user authentication factor are distinct from the one or more server devices; and initiating, by the at least one processing device, a processing of at least one user request, from a given user of the one or more users, to perform at least one automated action based at least in part on a result of an authentication performed using the at least one different user authentication factor of the different security state, wherein the given user is authenticated in response to a successful evaluation of the at least one different user authentication factor by the at least one different server device.

9. The apparatus of claim 8, wherein at least one of the first security state and the different security state comprises different authentication factors for two or more different classes of users.

10. The apparatus of claim 9, wherein the at least one of the first security state and the different security state comprises a respective specification of authentication factors and user privileges for each of the two or more different classes of users.

11. The apparatus of claim 8, wherein the first security state and the different security state are each associated with a different stage of a product lifecycle associated with the at least one processing device.

12. The apparatus of claim 8, wherein the first security state and the different security state are each associated with a different designated threat level associated with the at least one processing device.

13. The apparatus of claim 8, further comprising receiving, by a management controller, a specification of the respective user authentication factors of at least one of the first security state and the different security state.

14. The apparatus of claim 8, wherein at least one of the first security state and the different security state comprises at least one authentication factor based at least in part on a physical presence of a user in proximity to a designated authentication server.

15. A non-transitory processor-readable storage medium having stored therein program code of one or more software programs, wherein the program code when executed by at least one processing device causes the at least one processing device to perform the following steps:

configuring at least one processing device comprising a processor coupled to a memory to be in a first one of a plurality of security states, wherein the first security state defines one or more user authentication factors evaluated at least in part by one or more server devices that authenticate one or more users, wherein the one or more server devices are distinct from the at least one processing device;

automatically transitioning, by the at least one processing device, the at least one processing device to a different security state of the plurality of security states, in response to detecting, by the at least one processing device, an unavailability status of at least a given server device of the one or more server devices, wherein the different security state defines at least one different user authentication factor to be evaluated at least in part by at least one different server device, of the one or more server devices, wherein the at least one different user authentication factor is different than each of the one or more user authentication factors evaluated by the at least one given server device, wherein the at least one different server device is available at a time of the automatic transition and authenticates one or more users using the at least one different user authentication factor, wherein the one or more user authentication factors and the at least one different user authentication factor are distinct from the one or more server devices; and initiating, by the at least one processing device, a processing of at least one user request, from a given user of the one or more users, to perform at least one automated action based at least in part on a result of an authentication performed using the at least one different user authentication factor of the different security state, wherein the given user is authenticated in response to a successful evaluation of the at least one different user authentication factor by the at least one different server device.

16. The non-transitory processor-readable storage medium of claim 15, wherein at least one of the first security state and the different security state comprises different authentication factors for two or more different classes of users.

17. The non-transitory processor-readable storage medium of claim 16, wherein the at least one of the first security state and the different security state comprises a respective specification of authentication factors and user privileges for each of the two or more different classes of users.

18. The non-transitory processor-readable storage medium of claim 15, wherein the first security state and the different security state are each associated with one or more of a different stage of a product lifecycle associated with the at least one processing device and a different designated threat level associated with the at least one processing device.

19. The non-transitory processor-readable storage medium of claim 15, further comprising receiving, by a management controller, a specification of the respective user authentication factors of at least one of the first security state and the different security state.

20. The non-transitory processor-readable storage medium of claim 15, wherein at least one of the first security state and the different security state comprises at least one authentication factor based at least in part on a physical presence of a user in proximity to a designated authentication server.

* * * * *